United States Patent [19]

Hayward

[11] Patent Number: 4,858,082
[45] Date of Patent: Aug. 15, 1989

[54] EMERGENCY LIGHT SYSTEM

[76] Inventor: Walter Hayward, 3307 N. Chestnut Ave., Loveland, Colo. 80538

[21] Appl. No.: 189,701

[22] Filed: May 3, 1988

[51] Int. Cl.$^4$ ................................................. B60Q 7/00
[52] U.S. Cl. ........................................ 362/74; 362/61; 362/250; 362/287; 362/332; 340/471
[58] Field of Search ................... 362/61, 74, 184, 269, 362/285, 287, 293, 249, 250, 332; 340/81 R, 87, 89, 97, 69, 331, 332, 84, 90, 98, 124, 145, 471, 472, 473; 116/202

[56] References Cited

U.S. PATENT DOCUMENTS

| 1,401,988 | 1/1922 | Knapp | 340/100 |
|---|---|---|---|
| 1,674,340 | 6/1928 | Nock | 362/74 |
| 1,764,474 | 6/1930 | Shippee | 362/293 |
| 2,775,688 | 12/1956 | Golden | 362/74 |
| 2,918,566 | 12/1959 | Lunsford | 362/74 |
| 3,318,631 | 5/1967 | Levy | 362/74 |
| 3,576,437 | 4/1971 | Peron | 362/61 |
| 3,688,259 | 8/1972 | Rebillt | 340/33 |
| 3,729,707 | 4/1973 | Gaetano | 340/97 |
| 3,846,672 | 11/1974 | Doughty | 340/114 B |
| 4,613,847 | 9/1986 | Scolari et al. | 340/84 |
| 4,630,029 | 12/1986 | Hayward | 340/84 |
| 4,740,872 | 4/1988 | Chou | 362/184 |
| 4,751,618 | 6/1988 | Iacovelli | 362/74 |
| 4,761,718 | 8/1988 | Allen | 340/97 |

FOREIGN PATENT DOCUMENTS 523597 4/1956 Canada ................... 362/74

Primary Examiner—Ira S. Lazarus
Assistant Examiner—Richard R. Cole
Attorney, Agent, or Firm—Hugh H. Drake

[57] ABSTRACT

A visor-mountable emergency light system includes a housing of a size and shape to be mountable to and carried by a vehicle sunvisor. One or two portions of the housing have a conformation receptive of a strobotron exposed for directing light outwardly away from the housing. Another portion of the housing is conformed to define a cavity within which is located a firing unit mounted and connected to cyclically ignite the strobotron. The strobotron includes a light-transmissive lens that has a central area which transmits light of one or more specific colors and a peripheral area which transmits at least primarily uncolored light.

9 Claims, 3 Drawing Sheets

EMERGENCY LIGHT SYSTEM

The present invention pertains to an emergency light system. More particularly, it relates to such a system as adapted for use on a vehicle.

Emergency light systems for vehicles are well known. Light bars mounted atop present-day law enforcement vehicles employ so-called strobe lights which alternately and cyclically flash in various different colors. It also has been known for law enforcement officers to use flashing light systems which are normally concealed but which can be mounted on the dash or on top of the roof when making an emergency run.

At the same time, the existence of reasonbly inexpensive strobe-type lights have led to the implementation of battery powered flashing warning lights placed on or near all kinds of objects such as barricades and hazards. Many of such strobe lights are either green, yellow, blue or red, depending on their purpose. White strobe lights have been employed on super-high towers in order to warn approaching aircraft.

A desirable feature is an efficient emergency light system which is capable of being temporarily mounted on what may often be a non-marked vehicle. That is, it should be capable of being moved out of sight most of the time but yet be accessible to place it into active use. That characteristic also is found in prior devices intended to be energized from a cigarette lighter receptacle and connected by a cord to enable placement either on the dash or by magnetic mount on top of the roof of the vehicle. One convenient place to mount assessory apparatus in a vehicle is on the visor. Various devices have been mounted to a visor. Those include mirrors, map reading lights, radar detectors and eyeglass cases.

A general objective of the present invention is to provide an emergency light system which adequately achieves certain functions of the prior art while doing it in more convenient and efficient manner.

Another object of the present invention is to provide an emergency light system which includes an improved lens system that augments the efficacy of the unit.

In accordance with one aspect of the present invention, a visor-mountable emergency light system comprises a housing of a size and shape to be mountable to and carried by a vehicle visor. At least one portion of the housing has a conformation receptive of a strobotron exposed for directing light outwardly away from the housing. Another portion of the housing is conformed to define a cavity. A strobotron is mounted to the one portion. A firing unit is mounted within the cavity and is connected to cyclically ignite the strobotron. Of course, there are means for energizing the firing unit.

In an alternative aspect of the invention, the strobotron includes a light-transmissive lens that has one area which transmits light of one or more specific colors and another area which transmits light at least primarily without coloration. In the strobotron, there is a light surface exposed to illuminate substantially uniformly both of the aforementioned areas.

The features of the present invention which are believed to be patentable are set forth with particularity in the appended claims. The organization and manner of operation of one or more specific embodiments in the invention, together with further objects and advantages thereof, may best be understood by reference to the following description taken in connection with the accompanying drawings, in the several figures of which like reference numerals identify like elements, and in which:

Figure 1:
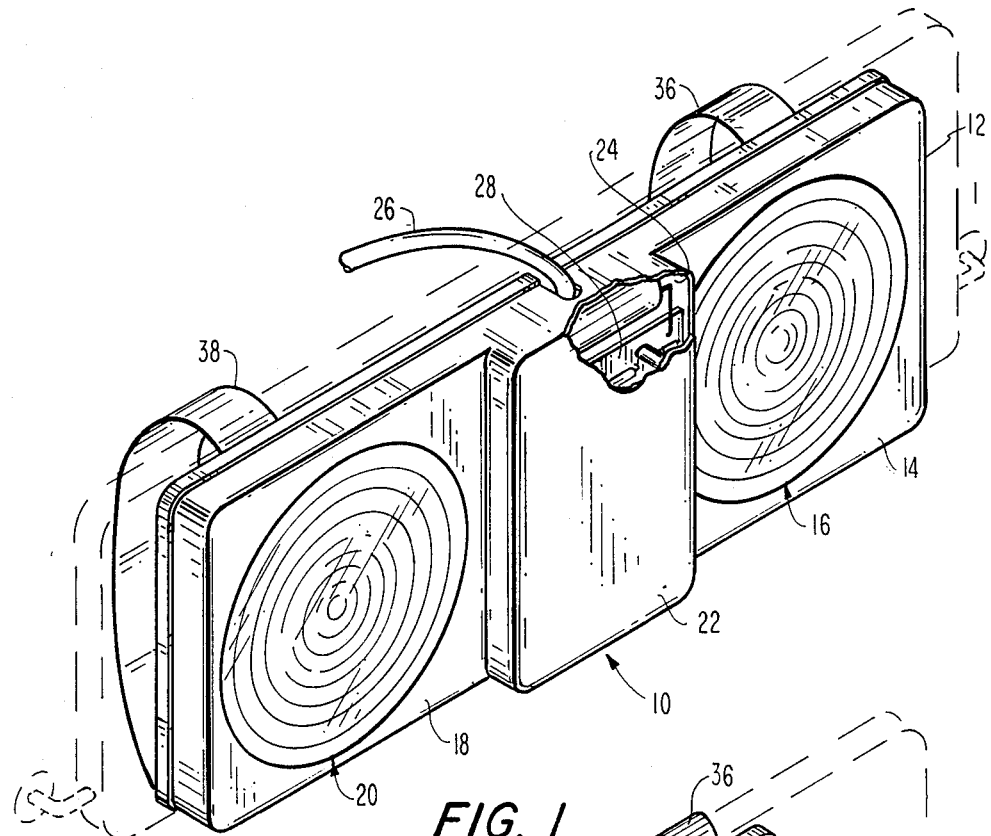
FIG. 1 is an isometric view of one embodiment of the invention.

An emergency light system 10 includes a housing 12 which is generally rectangular and otherwise is of a size and shape so that it is mountable to a conventional vehicle visor in order to be carried thereby. For example, its actual size in a commercial embodiment is four and seven-eights inches by thirteen and one-fourth inches by one and one-eighth inches over its thickest part. Additionally, it may be fitted with a hinge to enable it to be substituted for and thereby serve in place of the original-equipment visor.

Preferably, the housing is molded from a lightweight plasic material which exhibits a high dielectric constant in order to isolate high voltages of the operating components contained within housing 12. One portion 14 of the housing has a conformation enabling it to receive a strobotron 16 exposed for directing light outwardly away from the housing. A further portion 18 of the housing shown in FIG. 1 similarly has a conformation receptive of another strobotron 20 also exposed for directing light outwardly away from the housing.

A still additional portion 22 of the housing is conformed to define internally a cavity 24. As shown, a cord 26 leads outwardly from housing 12 and is terminated with a cigarrette-lighter plug in order to energize the firing unit 28 disposed within cavity 24. In the alternative, cord 26 may otherwise be connected into the vehicular battery system. In another alternative, housing 12 may include further compartment space receptive of one or more flashlight-type or other batteries.

Figure 2:
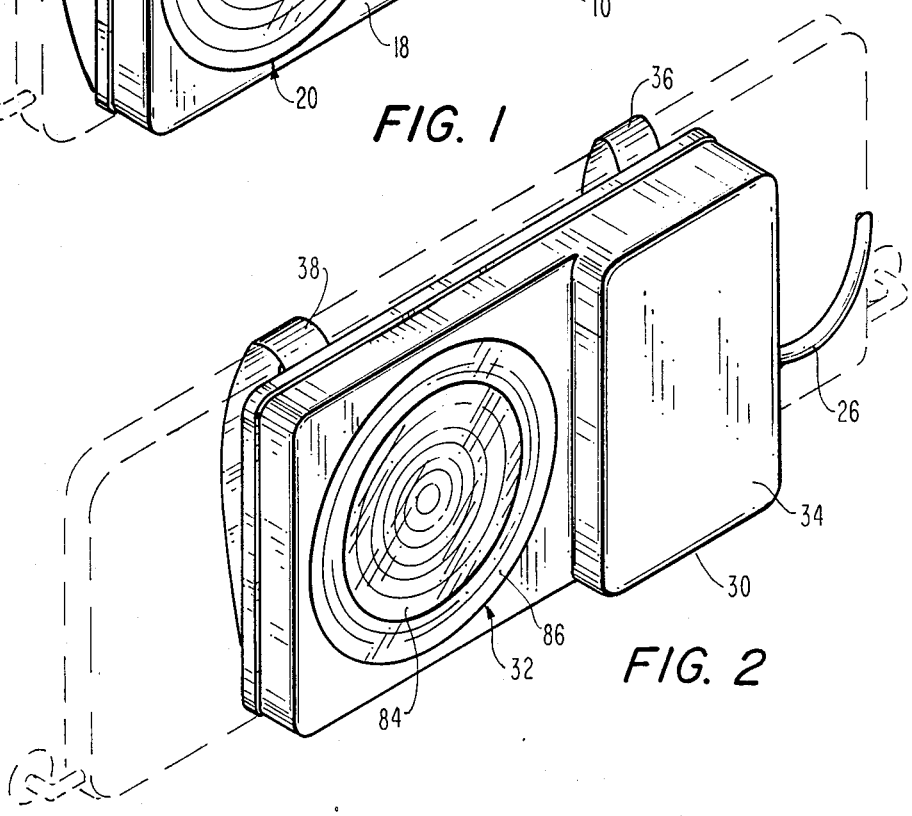
FIG. 2 is an isometric view of another embodiment of the present invention.

A simplified version as shown in FIG. 2 has a housing 30 of shorter length and includes mounted thereto only a single strobotron 32 connected internally to a firing circuit contained within a cavity defined within a housing portion 34. Except for having only a single flashing light, the units are otherwise manufactured by use of the same approach. In either case, an on-off switch may also be mounted on the housing in order to control the supply of power. That may be operated manually or, in an alternative, may be orientationally-operated so as to supply power to the unit when housing 12 or 30 is moved toward the vertical or operative position.

As illustrated, housings 12 and 30 have attached to their backside a pair of straps 36 and 38 each of which cooperatively terminates in a pair of Velcro fasteners. Straps 36 and 38 enable the housing simply to be strapped into place for mounting on a visor. Alternatively, such mounting may be accomplished by the use of spring clips, wire forms, elastic straps, webbing with buckles or the like.

Figure 3:
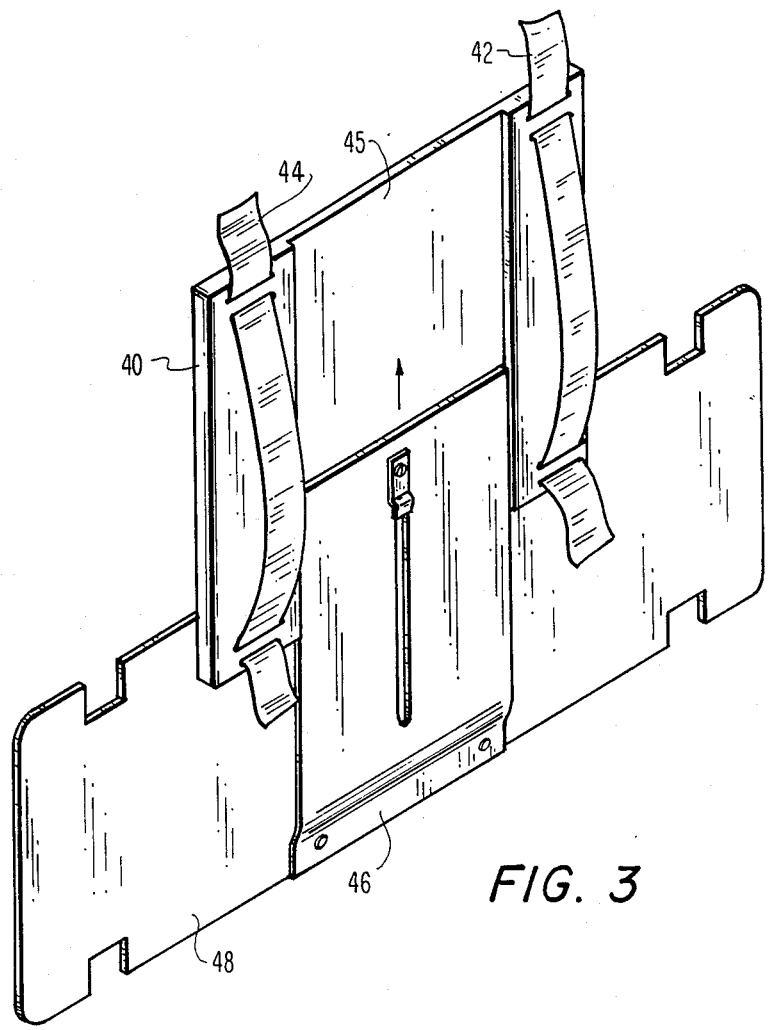
FIG. 3 is a perspective view of an alternative mounting assembly.

A different form of mounting is illustrated in FIG. 3. A plate 40 is of a size and shape essentially the same as the housing in order to seat against a visor. Plate 40 may alternatively actually be substituted for the original sunvisor as before or it may be fastened by straps 42 and 44 or by any other means described above for directly fastening the housing. Included on plate 40 is a slideway 45 in which is movably seated a tongue or slide 46 affixed to a support 48. Housing 12 is removably attached to support 48 as it was attached directly to the visor in FIG. 1. Slideway 45 and tongue 46 enable movement of the housing to a position in which the strobotrons direct light outwardly from the vehicle. For storage and concealment at other times, the housing is slid or telescoped into a position aligned over the plate 40.

The illustrated and preferred embodiments actually afford utility for use other than the visor-mounted mode. That is, the user, such as a law officer and especially when having to start out in a hurry in an unequipped vehicle, may simply prop the unit atop the dashboard so that the strobotron or strobotrons are directed outwardly through the windshield. Another alterative would be to mount one of the housings, perhaps on a flip-up frame, on the rear deck so as to direct light outwardly from the rear window in order to inform following vehicles that it is active on an emergency procedure, to warn against the fact that the unit is stopped in a possibly undesireable place for whatever reason but which might even include a flat tire. It may be appropriate to hingedly mount the housing inside the trunk lid for use when the trunk is open.

Strobotrons 16, 20 or 32 are now a well-known kind of light source. They include a gas-filled envelope or tube across opposite ends of which a high voltage is applied. They further include a trigger electrode which, when suitably also energized, ignites the gas in order to give off a bright flash of light. Although originally developed for use in timing instrumentation and time-lapse photography, they have today found their way into all kinds of different uses as mentioned in the introduction.

Figure 4:
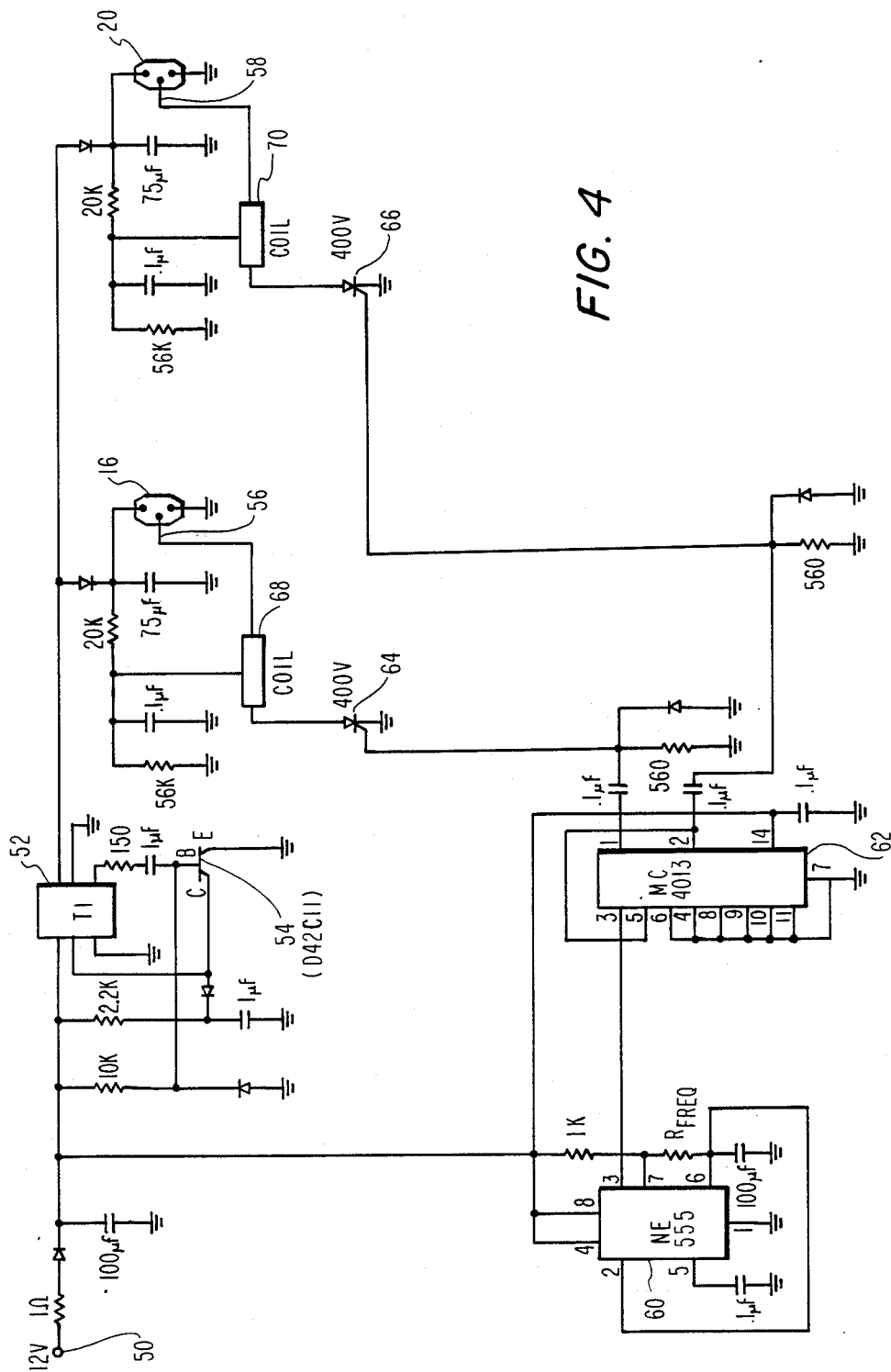
FIG. 4 is a schematic diagram of a circuit for igniting the illumination of components in one embodiment of the present invention.

Preferred for use in the present environment are strobotrons which produce flashes of illumination at five-hundred-thousand candle power. Because strobotrons in themselves have been so widely used, a wide variety of firing circuits or units are known and by now have become conventional. Thus, the circuit shown in FIG. 4 is but one example and even it will not need to be described in detail. For that reason, actual component values of different elements within the circuitry are sufficiently illustrated in the figure to enable a technician to construct it.

The positive side of the vehicle battery is connected at terminal 50, while all of the indicated ground connections are returned to the other side of the battery. The supplied power is fed to a transformer 52 which develops a voltage sufficiently high to ignite the gas discharge at what needs to be only a very low current such as 0.3 ampere. To enable such voltage step-up, a transistor 54, energized by the incoming DC voltage, is part of circuitry which enables transistor 54 to serve as an oscillator. That approach is analogous to energizing circuits developed about fifty years ago to fire the gas-filled tubing in neon signs.

The high-voltage alternating potentials are applied across strobotrons 16 and 20 that include respective trigger electrodes 56 and 58. It will be noted that the basic mode of operation is to rapidly build up a stored energy charge on the respective ones of capacitors C11 and C12. The application of a pulse to the respective trigger electrodes 56 and 58 ignites the flash.

A timing circuit begins with a timer 60 that controls operation of a flip-flop 62 in order to provide alternating on-gate voltages to the gates of respective SCRs 64 and 66. SCRs 64 and 66 are powered, in order to supply the trigger current, through respective voltage step-up autotransformers or coils 68 and 70.

It is again noted that the approach of FIG. 4 is only exemplary. Different strobotrons may require for operation different applied voltages and available current capacity. The unit illustrated operates strobotrons 16 and 20 at ninety alternate flashes per minute.

Each strobotron includes internally an arcdischarge type lamp, usually in the form of a tube, and is covered by a lens 80 which allows light from the arc to be presented outwardly from the housing. In one form, as illustrated, an outer lip 82 of the lens 80 is secured in place under the molded top of the housing, and the arc-tube is seated in place behind the lens and between the lower and upper covers of the housing. In itself, that is not a requirement, in the sense that the strobotron could be a separate fixture mounted atop the upper surface of the housing or otherwise mounted.

In any case, lens 80 preferably is molded of a somewhat-rigid plastic material, although it alternatively could be made of glass colored as is to be described. At least the entire central and principal area 84 of lens 80 is colored so that it transmits light primarily of one or more of a specific color. At least for the usual emergency uses, the desired color, selected by the user, would probably be one of red, blue, amber, green or clear (uncolored). Experience with warning lights for law inforcement use would suggest that, in a version such as shown in FIG. 1, the two colors of the respective strobotrons 16 and 20 would be different and contrasting.

Figure 5:
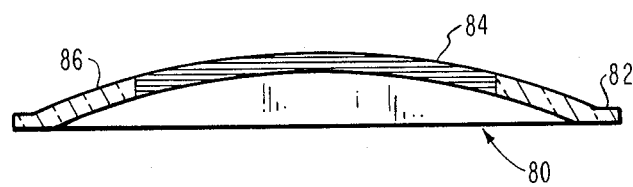
FIG. 5 is a cross-sectional view taken along the line 5—5 of FIG. 2 with respect to a light-transmissive lens.

Preferably, a peripheral and secondary area 86 of lens 80 is uncolored or clear so as to transmit the light as a halo at brightest intensity. As seen in FIG. 5 and also denominated in FIG. 2, peripheral region 86 is in the form of a ring which is radially narrow relative to central region 84. When that "halo" of light surrounds a colored area, the attention of a viewer tends to be more strongly attracted.

The light from the strobotron itself typically is so bright that the viewer is not aware of much or any coloration in its own spectral distribution. Often, it does happen to be shaded slightly toward blue, although sodium-based gases shade toward yellow.

As indicated, peripheral area 86 appears to be most effective when the lens is devoid of coloration in that area so as to transmit the maximum amount of available illumination. Of course, it might perform almost as well if, for some other reason, given a slight degree of coloration such as a pale yellow which defined a contrast with the darker coloration of central area 84. While it is difficult to describe the sensory perception in terms of psychology, the brighter halo surrounding the instructive colored area appears definitely to be better for getting an observer's attention.

While particular embodiments of the invention have been shown and described, and various alternatives and modifications have been taught, it will be obvious to those skilled in the art that changes and modifications may be made without departing from the invention in its broader aspects. Therefore, the aim in the appended claims is to cover all such changes and modifications as fall within the true spirit and scope of that which is patentable.

I claim:

1. An emergency light system in use mounted in combination with a vehicle visor and comprising:
   a housing of a size and shape to be mountable to and carried by said vehicle visor;
   means for mounting said housing to said visor;
   at least one portion of said housing having a conformation receptive of a strobotron exposed for directing light only outwardly of said vehicle away from said housing when in use;
   another portion of said housing conformed to define a cavity;
   a strobotron mounted to said one portion;
   a firing unit mounted within said cavity and connected to cyclically ignite said strobotron;
   and means for energizing said firing unit.

2. A system as defined in claim 1 in which:
   a further portion of said housing has a conformation receptive of a second strobotron exposed for directing light outwardly away from said housing;
   a second strobotron mounted to said further portion;
   and in which said firing unit alternately ignites said first and second strobotrons.

3. A light system as defined in claim 1 in which said mounting means further includes:
   a plate sized and shaped to seat against the visor;
   and means for movably attaching said housing to said plate in order to enable movement of said housing to a position in which said strobotron directs light outwardly from said vehicle.

4. A system as defined in claim 3 in which said attaching means includes a slideway secured between said plate and said housing to permit telescoping movement of said housing relative to said plate.

5. A system as defined in claim 1 in which said strobotron includes:
   a single light-transmissive lens for transmitting light from said strobotron and which has one colored area that occupies a centrally located principal region of said lens and transmits light primarily of one or more specific colors and another at least substantially uncolored area that occupies only a secondary peripheral region of said lens surrounding and radially narrow relative to said central region and transmits said light at least primarily without inducing coloration;
   and which also includes a single light source disposed to illuminate substantially uniformly both of said areas to produce a halo of light from said peripheral region at brightest intensity surrounding and relative to said principal region.

6. A strobotron assembly which comprises:
   a strobotron:
   a single light-transmissive lens for transmitting light from said strobotron and which has one colored area that occupies a centrally located principal region of said lens and transmits light primarily of one or more specific colors and another at least substantially uncolored area that occupies only a secondary peripheral region of said lens surrounding and radially narrow relative to said central region and transmits said light at least primarily without inducing coloration;
   and which also includes a single light source disposed to illuminate substantially uniformly both of said areas to produce a halo of light from said peripheral region at brightest intensity surrounding and relative to said principal region.

7. An emergency light system comprising:
   a vehicle visor of a predetermined size and shape which defines a housing;
   at least one portion of said housing having a conformation receptive of a strobotron exposed for directing light only outwardly of said vehicle away from said housing when in use;
   another portion of said housing conformed to define a cavity;
   a strobotron mounted to said one portion;
   a firing unit mounted within said cavity and connected to cyclically ignite said strobotron;
   and means for energizing said firing unit.

8. A system as defined in claim 7 in which:
   a further portion of said housing has a conformation receptive of a second strobotron exposed for directing light outwardly away from said housing;
   a second strobotron mounted to said further portion;
   and in which said firing unit alternately ignites said first and second strobotrons.

9. A system as defined in claim 7 in which said strobotron includes:
   a single light-transmissive lens for transmitting light from said strobotron and which has one colored area that occupies a centrally located principal region of said lens and transmits light primarily of one or more specific colors and another at least substantially uncolored area that occupies only the secondary peripheral region of said lens surrounding said central region and transmits said light at least primarily without inducing coloration;
   and which also includes a single light source disposed to illuminate substantially uniformly both of said areas to produce a halo of light from said peripheral region at brightest intensity surrounding and relative to said principal region.

* * * * *